Figure 1:
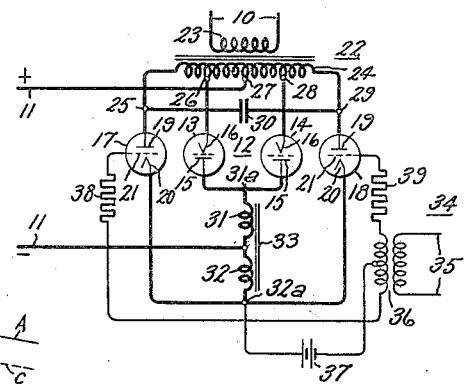

Aug. 6, 1940.   R. TRÖGER   2,210,785
ELECTRIC VALVE CONVERTING APPARATUS
Filed Oct. 27, 1939   3 Sheets-Sheet 1

Inventor:
Richard Tröger,
by Harry E. Dunham
His Attorney.

Aug. 6, 1940.  R. TRÖGER  2,210,785
ELECTRIC VALVE CONVERTING APPARATUS
Filed Oct. 27, 1939  3 Sheets-Sheet 2

Inventor:
Richard Tröger,
by Harry E. Dunham
His Attorney.

Aug. 6, 1940.  R. TRÖGER  2,210,785
ELECTRIC VALVE CONVERTING APPARATUS
Filed Oct. 27, 1939  3 Sheets-Sheet 3
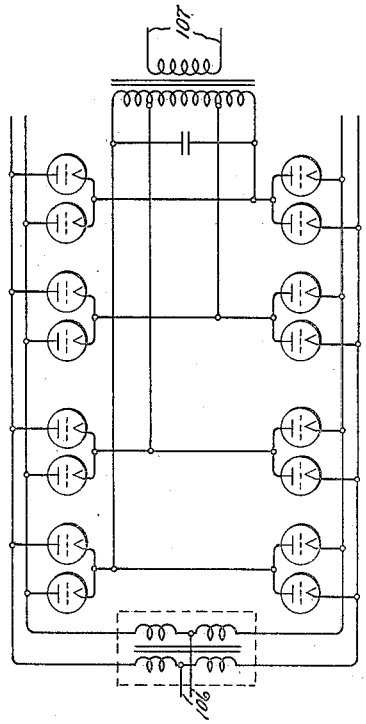
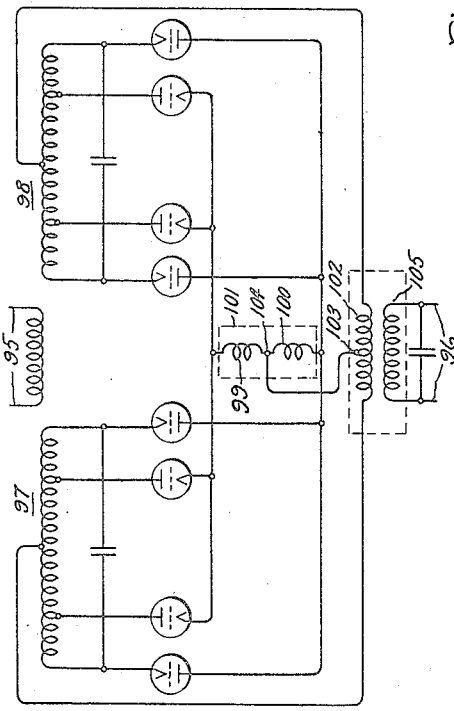
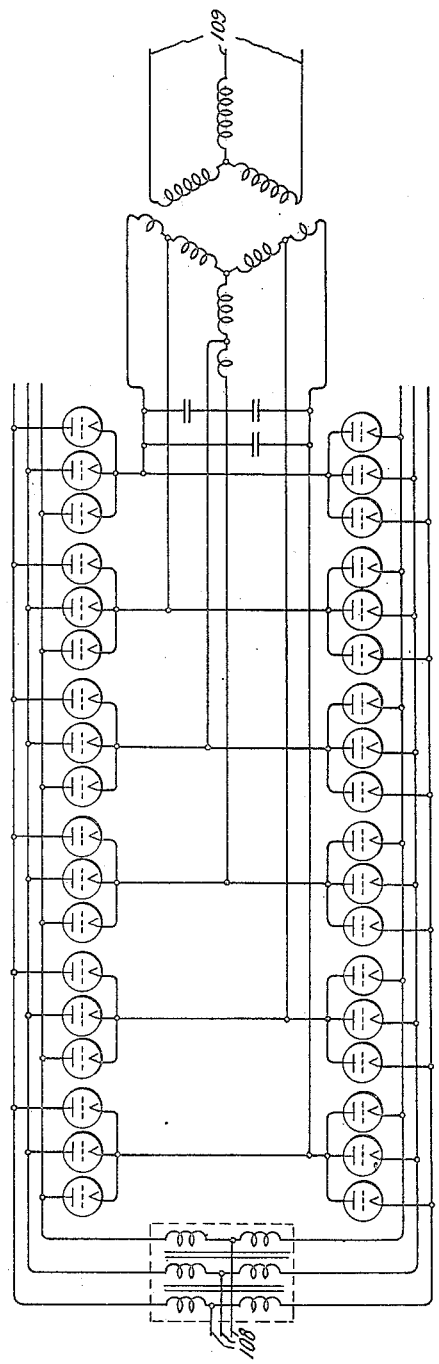
Inventor:
Richard Tröger,
by Harry E. Dunham
His Attorney.

Patented Aug. 6, 1940

2,210,785

UNITED STATES PATENT OFFICE 2,210,785

ELECTRIC VALVE CONVERTING APPARATUS

Richard Tröger, Berlin-Zehlendorf, Germany, assignor to General Electric Company, a corporation of New York Application October 27, 1939, Serial No. 301,668
In Germany October 29, 1938

11 Claims. (Cl. 171—97)

My invention relates to electric valve converting apparatus for transmitting energy between a direct current system and an alternating current system or between two alternating current systems of like or different frequencies.

It is desirable to provide an electric valve converting apparatus for transmitting energy between direct and alternating current circuits or between two alternating current circuits of like or different frequency where the transfer of energy takes place freely without regard to the variations in load or the kind of load, that is to say, without regard as to whether the load is effective or wattless and without regard as to how quickly the changes in load take place. In other words, it would be desirable to provide an electric valve converting apparatus which operates very much like a transformer in relation to the exchange of energy between the circuits.

Electric valve converting systems have been used wherein both a rectifier and an inverter are embodied in one apparatus for transmitting energy in either direction between direct and alternating current circuits or wherein two such systems are connected in series for transmitting energy in either direction between two alternating current circuits of like or different frequencies. In such apparatus, however, difficulties have been encountered in so far as the exchange of wattless power between the circuits is concerned. The wattless output of such an electric valve converting apparatus is very similar to the effective output except that it has a frequency twice that of the system frequency. In the case of traction motors, elevators, and the like where it is often desirable to transmit energy in either direction between direct current and alternating current circuits or the like, the change of direction of effective power flow takes place more or less irregularly and quite slowly. For example, in connection with traction motors the effective power may be transmitted continuously from the alternating current circuit to the direct current circuit for intervals involving many minutes without any change in the direction of power flow. As far as the wattless output is concerned, however, the change in direction of energy flow occurs twice during each cycle of the alternating current circuit. In other words, rectification and inversion alternately take place but the resultant effective power exchange between the circuits is zero. If, therefore, the conventional direct current reactor is connected in series with the rectifier and another reactor connected in series with the rectifier and another reactor connected in series with the inverter these reactors afford no great impedance to the flow of effective power between the circuits since it has been shown such change of direction of power flow is very slow. However, as far as the exchange of wattless energy is concerned these reactors furnish such an impedance at the high frequency, that is, twice the system frequency, that such wattless energy exchange is practically suppressed and it therefore is a difficult matter to supply for example, a lagging power factor load on the alternating current side. It has been suggested to connect a condenser across the inverter circuit to supply the necessary wattless component but in order to maintain the voltage constant in the case of a variable wattless load it is necessary to regulate the capacitance of such condenser which presents technical difficulties in operation and does not make for a simple, desirable apparatus.

In order to eliminate the above mentioned suppression of the wattless transmission of energy it has been suggested to arrange these reactors on a common core in such a manner that regardless of the direction of energy transmission no change of flux in the reactor core is required but only a change in the distribution of ampere turns. Hence since the flux need not be built up and torn down with each reversal of energy flow these reactors furnish very little impedance even to the wattless component and it is therefore possible to supply a load requiring a large wattless energy component.

In spite of the fact that the above described use of two reactors wound on a common core in connection with an electric valve converting apparatus for transmitting energy in either direction was known to enable a better exchange of the wattless energy component, such electric valve systems have not been found satisfactory for large installations. This is true because these reactors mounted on a common core act like any other direct current choke by serving as a buffer between the direct and alternating current circuits and they store and dissipate energy as the case may be. When these reactors dissipate their energy excessive circulating currents are set up especially in large systems so that large energy losses occur, as well as damage to the apparatus from the excessive currents. By my invention, however, I retain the advantages of the two reactors wound on a single core and provide means for substantially eliminating the excessive circulating currents.

It is an object of my invention, therefore, to provide a new and improved electric valve converting apparatus for transmitting energy between direct and alternating current circuits or between two alternating current circuits of the same or different frequencies, which will overcome the above mentioned disadvantages of the arrangements of the prior art and which will be simple and reliable in operation.

It is another object of my invention to provide a new and improved electric valve converting apparatus.

It is a further object of my invention to provide a new and improved electric valve converting apparatus whereby the wattless energy component may be satisfactorily supplied to a variable load.

It is still a further object of my invention to provide a new and improved electric valve converting apparatus whereby a free exchange of wattless energy may occur without setting up excessive circulating currents and whereby efficient operation of the apparatus is obtained.

In accordance with the illustrated embodiments of my invention I provide an electric valve converting apparatus for transmitting energy in either direction between a direct current circuit and an alternating current circuit or between two alternating current circuits of the same or different frequencies. This electric valve converting apparatus includes both a rectifier and an inverter. Transformer means are provided which are associated with both the rectifier and the inverter and such transformer means provide a different ratio of transformation when the system operates to transmit energy from the direct current circuit to the alternating current circuit than when transmission of energy in the opposite direction occurs. Furthermore, the reactor connected in the direct current circuit of the rectifier is mounted on the same core with the reactor connected in the direct current circuit of the inverter so that regardless of whether rectification or inversion is taking place, the flux produced by these reactors is always in the same direction. By this arrangement a maximum exchange of wattless energy is brought about without producing excessive circulating currents.

Figures 1A, 2:
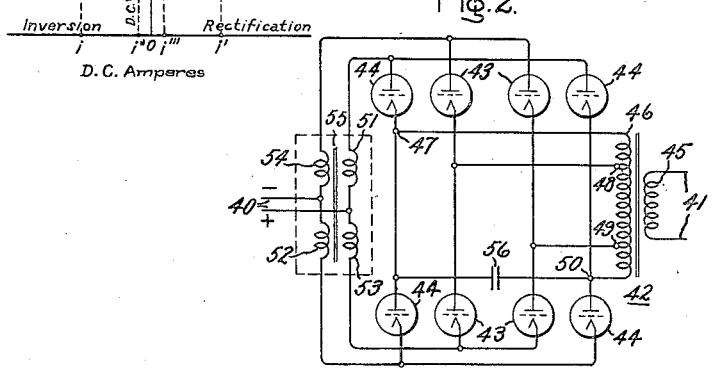

The novel features which I believe to be characteristic of my invention are set forth with particularity in the appended claims. My invention itself, however, both as to its organization and method of operation, will best be understood by reference to the following description taken in connection with the accompanying drawings in which Fig. 1 is a diagrammatic representation of an electric valve converting apparatus for transmitting energy between direct and alternating current circuits in which my invention has been embodied; Fig. 1a represents certain operating characteristics of the apparatus illustrated in Fig. 1; Figs. 2, 3, 4, and 5 are modifications of Fig. 1 for transmitting energy between direct and alternating current circuits; Figs. 6, 7, and 8 are embodiments of my invention wherein energy is transmitted between two alternating current circuits of the same or different frequencies.

Referring now to Fig. 1 of the drawings, I have illustrated therein an electric valve converting apparatus for transmitting energy between an alternating current circuit 10 and a direct current circuit 11. Although my invention is applicable to any of the electric valve converting systems well known in the art as will be shown later, I have illustrated in Fig. 1 a single phase alternating current circuit with a minimum number of electric discharge valves for transmitting energy between the direct and alternating current circuits. In order to transmit energy from the alternating current circuit 10 to the direct current circuit 11 I provide a bi-phase rectifier 12 including a pair of electric discharge valves 13 and 14, each provided with an anode 15 and a cathode 16. In order to transmit energy from the direct current circuit 11 to the alternating current circuit 10 I provide an inverter comprising a pair of electric discharge valves 17 and 18 each provided with an anode 19, a cathode 20 and a control electrode or grid 21. A transformer 22 is associated with the electric discharge valves 13 and 14 of the bi-phase rectifier 12 and electric discharge valves 17 and 18 of the inverter. One winding 23 of transformer 22 is connected across the alternating current circuit 10 while the other winding 24 is provided with a plurality of terminals 25, 26, 27, 28, and 29. The mid-point terminal 27 is connected to the positive terminal of the direct current circuit 11. Winding 24 is connected so that the outside terminals 25 and 29 are connected to the anodes 19 of electric discharge valves 17 and 18, respectively, of the inverter, thus providing the maximum ratio of transformation. Intermediate terminals 26 and 28 of winding 24 are connected to the cathodes 16 of electric discharge valves 13 and 14 of the bi-phase rectifier 12. By this arrangement a larger ratio of transformation is provided by transformer 22 when converting the direct current from circuit 11 to alternating current in circuit 10 than when transferring energy from alternating current circuit 10 to direct current circuit 11 through bi-phase rectifier 12. A capacitor 30 is connected across the inverter circuit between terminals 25 and 29 in order to supply the necessary commutating potential for the inverter. A reactor 31 is connected in series with the bi-phase rectifier 12 at 31a and the direct current circuit, while a reactor 32 is connected in series with the inverter at 32a and the direct current circuit. Reactors 31 and 32 are arranged to be mounted on a single core 33 so as to produce a flux in the same direction, so that whether energy is being transferred from the direct current circuit to the alternating current circuit or from the alternating current circuit to the direct current circuit no change in direction of the flux in core 33 is necessary with change in direction of energy transmission, but rather only a redistribution of ampere turns is necessary. Thus reactors 31 and 32 may be considered as a single mid-tapped reactor with a portion thereof connected in the direct current circuits of the inverter and rectifier respectively. Control electrodes or grids 21 of electric discharge valves 17 and 18 of the inverter circuit are connected in a conventional control circuit 34. Any suitable source of alternating potential 35 is provided which source may, in certain cases, be alternating current circuit 10. By means of transformer 36 these control potentials are impressed upon control electrodes 21 of electric discharge valves 17 and 18. A suitable biasing battery 37 and current limiting resistors 38 and 39 are connected in the grid-to-cathode circuit of electric discharge valves 17 and 18. Electric discharge valves 13, 14, 17 and 18 may be any of the types well known by those skilled in the art, although I prefer to use valves of the vapor electric discharge type. These valves have been illustrated as of the single anode, single cathode type but it will be understood that multi-anode valves may equally well be used.

The operation of the apparatus illustrated in Fig. 1 will be well understood by those skilled in the art but will now be briefly described. When transferring energy from the alternating current circuit 10 to the direct current circuit 11, bi-phase rectifier 12 including electric discharge valves 13 and 14, operates to transmit energy between these circuits and direct current flows through reactor 31 causing a flux to be set up in core 33. A reversal of the direction of energy transmission requires electric discharge valves 17 and 18 to become conductive and current flows from the positive terminal of the direct current circuit 11 through transformer 22, electric discharge valves 17 and 18 and reactor 32 to the other terminal of the direct current circuit. This change in direction of energy transmission does not change the direction of the flux induced in core 33 and hence reactors 31 and 32 produce a minimum of impedance to the transfer of wattless energy which takes place at high frequency, i. e., twice the system frequency. Mounting reactors 31 and 32 on a common core each producing flux in the same direction reduces the impedance of the path which the commutating current of the inverter from capacitor 30 must take and hence a smaller source of commutating potential is necessary and likewise a larger reactive load may be connected to alternating current circuit 10 than could otherwise be supplied with the same capacitor 30. However, the alternating potential appearing at the terminals 31a, 32a of reactors 31 and 32 will, when terminal 32a is negative relative to 31a, cause a circulating current to flow for example through valves 13 and 17 or valves 14 and 18, as the case may be. If the same ratio of transformation were present for both rectifier and inverter, this circulating current could be very large and would be limited only by the arc-drop in valves 13 and 17 or 14 and 18. However, in accordance with my invention by providing a different ratio of transformation for the rectifier transformer than for the inverter transformer I provide the portion of transformer winding 24 between terminals 25 and 26 which provides an electromotive force to limit the circulating current through valves 13 and 17 due to the potential across reactors 31 and 32. Also the portion of winding 24 between terminals 28 and 29 provides the counter electromotive force to limit the circulating current between valves 14 and 18 due to the potential across reactors 31 and 32. It will be understood that when terminal 31a has a positive potential relative to 32a the electromotive force in the portions of winding 24 between terminals 25 and 26 and terminals 28 and 29 will be in such a direction as to oppose the circulating currents caused to flow through valves 13 and 17 after 17 has been made conducting and valve 14 and 18 after 18 has been made conducting by the potential across reactors 31 and 32. It will also be understood that when the potential of terminal 32a is positive relative to 31a the unilateral conducting action of valves 13, 14, 17, and 18 prevents any circulating currents due to the potential across reactors 31 and 32. Thus I have provided an electric valve converting apparatus which will allow the free exchange of wattless energy between two different circuits and yet wherein circulating currents causing large losses are suppressed. The ratio of transformation for the rectifier transformer as compared with the ratio of transformation for the inverter transformer should be chosen so that the rectifier may be operated without grids or control electrodes for obtaining maximum efficiency. An inverter, on the other hand, requires a source of commutating potential and cannot be operated without grids or control electrodes. Hence it is necessary to provide a sufficient phase advance of the grid potential in connection with an inverter to provide the necessary deionization time for the discharge valves so that commutation may take place while the voltage is in the proper direction for such transfer of current. If the same ratio of transformation were provided for the rectifier and inverter transformers the voltage regulation would be very poor unless grid excitation were provided for the rectifier and this grid excitation was sufficiently retarded in phase. This, of course, requires the rectifier to function under poor power factor conditions. In accordance with my invention, however, by providing a larger ratio of transformation for the inverter transformer than for the rectifier transformer this difficulty is eliminated. The ratio of transformation for inverter and rectifier transformers are so chosen that a smooth voltage regulation curve exists from zero to full load with either rectification or inversion and wherein it is possible at the same time to operate the rectifier as near unity power factor as possible without the use of any grid excitation or the like. This is clearly illustrated in Fig. 1a where the voltage regulation curve for a rectifier operating without grids is shown by the curve marked A, while the voltage regulation curve for the inverter circuit with a minimum phase angle advance and the same ratio of transformation of the inverter transformer as the rectifier transformer which produced curve A is illustrated by the dotted curve B. It is obvious that at light loads when operating at a direct current voltage corresponding to the value $x$ for example, large circulating currents $i$ and $i'$ must flow in the apparatus tending to cause considerable losses in the system. These circulating currents of course could be decreased by providing control electrodes for the rectifier and phasing back the grid excitation so as to reduce the direct current voltage of the rectifier to correspond with dotted curve C in Fig. 1a, whereby the voltage regulation curve BC for the rectifier inverter system would be satisfactory and reduce the circulating currents to a minimum. However, this would require the rectifier to operate inefficiently at poor power factor, and further would require a control circuit for the rectifier. If, however, a higher ratio of transformation is provided for the inverter transformer than for the rectifier transformer this difficulty is overcome since by proper choice of such ratios of transformation the voltage regulation curve of the inverter can be raised sufficiently to correspond with curve D of Fig. 1a so that the rectifier may be operated without grid excitation as near unity power factor as possible and the circulating currents $i''$ and $i'''$ at light loads at direct current voltage $y$ are substantially eliminated or negligible. It will be understood, of course, that the choice of this ratio of transformation will determine the magnitude of the circulating current at light loads. However, sufficient turns must be provided between terminals 25 and 26 and terminals 28 and 29 so as substantially to eliminate circulating currents due to the potential across reactors 31 and 32, as described above. In order that the proper ratio of transformation may be obtained for the inverter transformer and for the rectifier transformer, it may be desirable to place adjustable taps on winding 24 of transformer 22 whereby the proper ratio of transformation for the most optimum condition may readily be chosen.

Although I have illustrated reactors 31 and 32 as comprising the same number of turns it will be understood by those skilled in the art that in certain cases it may be desirable to provide more or less turns on reactor 31 than on reactor 32 and it may be desirable to place taps on reactors 31 and 32 so the turn ratios may be varied.

Thus far I have described my invention only in connection with an electric valve converting apparatus for transferring energy between a direct current circuit and a single phase alternating current circuit. It will, of course, be understood that my invention is equally applicable to all the various forms of electric valve converting apparatus known in the art. Accordingly, in Fig. 2 I have illustrated my invention applied to an electric valve converting apparatus for transmitting energy between direct and alternating current circuits wherein the bridge connection of electric discharge valves is used in order to obtain high utilization of the transformer and electric discharge valves. Energy is transmitted between direct current circuit 40 and alternating current circuit 41 which are interconnected by transformer means 42 and a plurality of electric discharge valves 43 and 44. Electric discharge valves 43 are adapted to be operated as rectifiers for converting alternating current from circuit 41 to direct current in circuit 40. Electric discharge valves 44, on the other hand, are adapted to convert direct current from circuit 40 into alternating current in circuit 41. Winding 45 of transformer 42 is connected across alternating circuit 41, while winding 46 of transformer 42 is associated with electric discharge valves 43 and 44. A plurality of terminals 47, 48, 49, and 50 are associated with winding 46 so that a different ratio of transformation is provided in transformer 42 when the electric valve converting apparatus is operating as a rectifier than when it is operating as an inverter. Reactors 51 and 52 connected in series, respectively, with the positive and negative terminals of the direct current circuit 40 are provided for the inverter circuit while reactors 53 and 54 connected in series, respectively, with the positive and negative terminals of direct current circuit 40 are provided for the rectifier circuit. These reactors are mounted on a single core 55 so as to produce flux in a single direction regardless of the direction of energy transmission, as described in connection with Fig. 1. A capacitor 56 is connected across the inverter transformer to provide a source of commutating potential. Electric discharge valves 44 of the inverter circuit are provided with control electrodes and any control circuit well known to those skilled in the art may be used to control the conductivity of these valves, for example, a control circuit similar to that illustrated in Fig. 1 may be utilized. The operation of the apparatus illustrated in Fig. 2 is similar to the operation of the apparatus illustrated in Fig. 1 and it is believed will be well understood by those skilled in the art without additional description.

Figure 3:
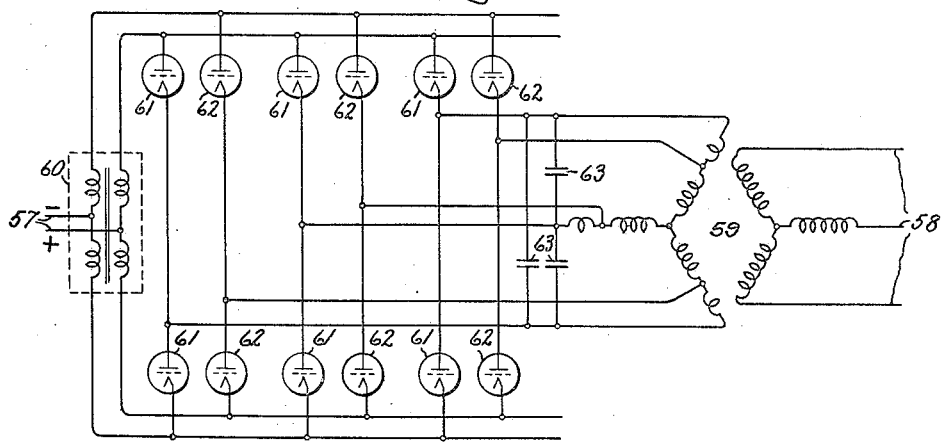

In Fig. 3 I have illustrated an electric valve converting apparatus similar to the apparatus illustrated in Fig. 2 for transmitting energy between direct current circuit 57 and polyphase alternating current circuit 58. As in Figs. 1 and 2, a transformer 59 is provided, affording a different ratio of transformation when the apparatus operates as a rectifier than when the apparatus operates as an inverter. Also, as in Figs. 1 and 2, the reactors shown schematically at 60 of both the rectifier circuit and the inverter circuit are mounted on a single core so as to produce flux in the core in only one direction, regardless of the direction of energy transmission so as to provide a low impedance for wattless energy exchanged between the circuits. Electric discharge valves 61 connected in a bridge circuit are arranged to transmit energy from direct current circuit 57 to alternating current circuit 58, while electric discharge valves 62 also connected in a bridge circuit are adapted to operate as a rectifier and transmit energy from alternating current circuit 58 to direct current circuit 57. A plurality of commutating capacitors 63 are connected across the three phases of the inverter circuit, as is well understood by those skilled in the art. The operation of the apparatus illustrated in Fig. 3 is identical with that shown in Fig. 2 so that no further explanation is believed to be necessary.

Figure 4:
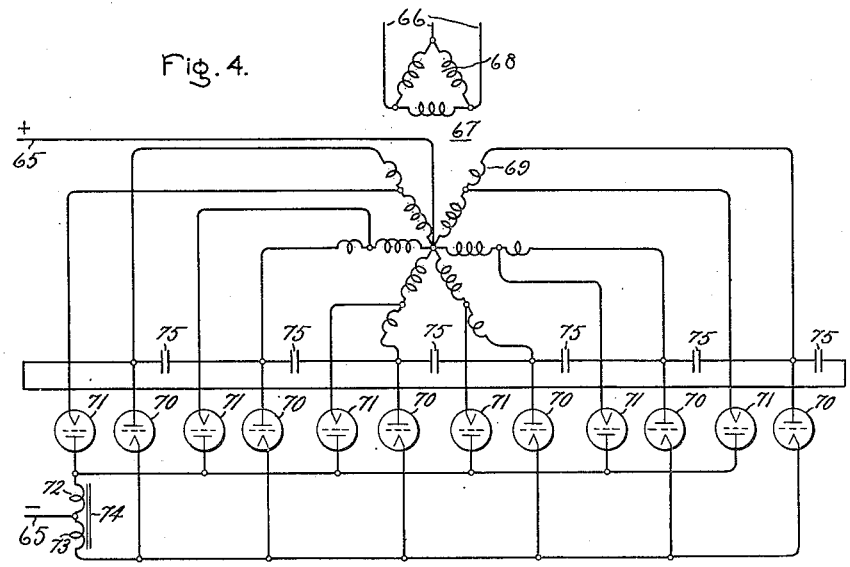

In Fig. 4 I have illustrated a six-phase electric valve converting apparatus for transmitting energy between direct current circuit 65 and three-phase alternating current circuit 66. Transformer 67 has one winding 68 connected across the alternating current circuit 66, while its other winding 69 is illustrated as a six-phase star-connected winding associated with electric discharge valves 70 and 71. Electric discharge valves 70 are connected in the inverter circuit for transmitting energy from direct current circuit 65 to alternating current circuit 66 and are associated with the outer terminals of winding 69 of transformer 67 so that a larger ratio of transmission exists in transformer 67 when the electric valve converting apparatus is operating as an inverter than when the electric valve apparatus is operating as a rectifier. Electric discharge valves 71 are connected in a rectifier circuit and are associated with intermediate terminals on winding 69 of transformer 67. A reactor 72 is connected in the direct current circuit in series with the rectifier circuit while reactor 73 is connected in the inverter circuit in one of the direct current leads. These reactors are mounted on a single core 74 and arranged so as to produce flux in a single direction regardless of whether the apparatus is operating as a rectifier or as an inverter. A plurality of commutating capacitors 75 are connected in the inverter circuit in order to provide a source of commutating potential.

Figure 5:
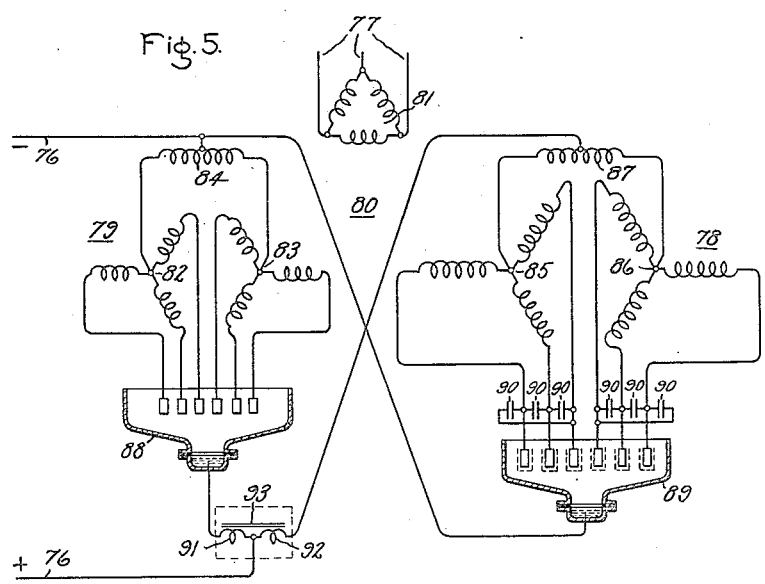

In Fig. 5 I have illustrated my invention as applied to an electric valve converting apparatus wherein multi-anode, single-cathode electric valve devices are used instead of the single-anode, single-cathode electric discharge valves described heretofore. By means of the apparatus illustrated in Fig. 5 energy may be transmitted from direct current circuit 76 to alternating current circuit 77 by means of inverter 78 and energy may be transmitted from alternating current circuit 77 to direct current circuit 76 by means of rectifier 79. Transformer 80 is provided having one winding 81 connected across the three-phase alternating current circuit 77 and inductively related thereto are windings 82 and 83 of the rectifier circuit 79 connected in double wye relation by means of interphase transformer 84 and windings 86 and 85 of inverter circuit 78 also arranged in double wye relation by means of interphase transformer 87. As may readily be seen, windings 85 and 86 of inverter circuit 78 are provided with more turns than corresponding windings 82 and 83 of rectifier circuit 79 so that a different ratio of transformation exists when the apparatus operates to transfer energy from the direct current circuit to the alternating current circuit than when transmission of energy in the opposite direction takes place. Electric discharge device 88 is associated with rectifier circuit 79 and electric discharge device 89 is associated with the inverter circuit 78. Both of these electric discharge devices 88 and 89 are illustrated as of the multianode, single-cathode type. A plurality of capacitors 90 are provided for the inverter circuit 78 in order to furnish a source of commutating potential. Reactor 91 connected in the rectifier circuit and reactor 92 connected in the inverter circuit are mounted on a single core 93 so that regardless of the direction in which energy is being transmitted between the direct and alternating current circuits the flux induced in core 93 will always be in the same direction and this wattless energy exchange may freely take place. The operation of the apparatus illustrated in Fig. 5 will be well understood by those skilled in the art in view of the description set forth for the operation of the apparatus illustrated in Fig. 1.

Although thus far my invention has been described only in connection with electric valve converting apparatus for transmitting energy between direct and alternating current circuits, it will be understood that it is equally applicable for use in connection with electric valve converting apparatus for transmitting energy between two alternating current circuits of the same or different frequencies. Accordingly, in Fig. 6 I have illustrated such an apparatus for transmitting energy between two single-phase alternating current circuits 95 and 96. This apparatus consists of two electric valve converting apparatus 97 and 98, each identical with the apparatus illustrated in Fig. 1 with their direct current circuits interconnected so that only a single reactor 99 is necessary for the rectifier circuits of devices 97 and 98 and only a single reactor 100 is necessary for inverter circuits of devices 97 and 98. These reactors 99 and 100 are mounted on a singlecore 101 and operate identically with the operation described in Fig. 1. A different ratio of transformation is provided for the inverter transformers of devices 97 and 98 than for the rectifier transformers of these same devices, as will be understood in view of the foregoing discussion. Winding 102 is connected in series with a portion of each of the direct current circuits of devices 97 and 98 and midtap 103 of winding 102 is connected to terminal 104 between reactors 99 and 100. Alternating current from alternating current circuit 96 may be obtained from winding 102 because of the inductive relation therewith of winding 105. It will be understood, of course, that energy may also be transmitted from alternating current circuit 96 to alternating current circuit 95. The two devices 97 and 98 operate alternately so that energy may be transmitted between the two alternating current circuits 95 and 96. If alternating current circuits 95 and 96 operate at different frequencies, then all the electric discharge valves, both those acting as rectifier valves and those acting as inverter valves, are provided with control electrodes.

In Fig. 7 I have illustrated an electric valve converting apparatus embodying my invention for transmitting energy between two single-phase alternating current circuits 106 and 107 wherein two electric valve converting systems similar to the one shown in Fig. 2 are superimposed with the direct current circuits interconnected. The operation of this apparatus will be well understood by those skilled in the art.

In Fig. 8 I have illustrated another modification of my invention for transmitting energy between three-phase alternating current circuit 108 and three-phase alternating current circuit 109. This apparatus is merely a modification of that shown in Fig. 7 so as to transmit energy between polyphase circuits and the operation thereof will be well understood by those skilled in the art.

While I have shown and described my invention in connection with certain specific embodiments, it will of course be understood that I do not wish to be limited thereto since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent of the United States, is:

1. In an electric valve converting apparatus, an alternating current circuit, a second circuit, means for transmitting energy between said circuits including a plurality of electric discharge valves so constructed and arranged as to transmit energy in either direction between said circuits, a transformer associated with said electric discharge valves providing a different ratio of transformation between said circuits for energy transmitted in one direction as compared with energy transmitted in the other direction, and a reactor, a portion of which is always connected in the direct current circuit regardless of the direction of energy transfer so as to present a minimum of impedance to the wattless current component interchanged between said circuits.

2. In combination, an alternating current circuit, a second circuit, means for transmitting energy in either direction between said circuits including a plurality of electric discharge valves arranged in an inverter circuit and a plurality of electric discharge valves arranged in a rectifier circuit, a transformer associated with both said inverter and said rectifier connected so as to provide a different ratio of transformation to said inverter circuit than to said rectifier circuit, a reactor connected in the direct current circuit of said inverter and a second reactor connected in the direct current circuit of said rectifier, said reactors being mounted on a common core so as to produce flux in the same direction whether energy is being transmitted by the inverter or by the rectifier.

3. In combination, an alternating current circuit, a direct current circuit, a transformer and a plurality of discharge valves arranged to transmit energy in either direction between said circuits, said transformer providing a different ratio of transformation when transmitting energy from said direct current circuit to said alternating current circuit than when transmitting energy from said alternating current circuit to said direct current circuit, and a reactor a portion of which is connected in the direct current circuit regardless of the direction of energy transfer between said circuits.

4. In an electric valve converting apparatus, a direct current circuit, an alternating current circuit, a bi-phase rectifier arranged to transmit energy from said alternating current circuit to said direct current circuit, an inverter arranged to transmit energy from said direct current circuit to said alternating current circuit, transformer means associated both with said rectifier and said inverter but presenting a different ratio of transformation between said circuits when said inverter is operating than when said rectifier is operating, and means including a pair of reactors one of which is connected only in the direct current circuit of said inverter while the other is connected only in the direct current circuit of said rectifier, said reactors being mounted on a common core so as to produce flux in a single direction whether said rectifier or said inverter is operating.

5. In combination an alternating current circuit, a second circuit, means for transmitting energy in either direction between said circuits including a plurality of electric discharge valves arranged in an inverter circuit and a plurality of electric discharge valves arranged in a rectifier circuit, a reactor connected in the direct current circuit of said inverter and a second reactor connected in the direct current circuit of said rectifier, said reactors being mounted on a common core so as to produce flux in the same direction whether energy is being transmitted by the inverter or by the rectifier, and means for reducing the circulating currents between said inverter and said rectifier circuits by virtue of the energy stored in said reactors comprising a potential introduced between said inverter and rectifier circuits having such a direction as to oppose said circulating currents.

6. In an electric valve converting apparatus an alternating current circuit, a second circuit, means for transmitting energy between said circuits including a plurality of electric discharge valves so constructed and arranged as to transmit energy in either direction between said circuits, a transformer associated with said electric discharge valves providing a larger ratio of transformation between said circuits when energy is transmitted from said second circuit to said alternating current circuit than when energy is transmitted from said alternating current circuit to said second circuit so that a straight line voltage regulation curve may be obtained regardless of the direction of energy transfer between said circuits.

7. In an electric valve converting apparatus a direct current circuit, an alternating current circuit, a group of electric discharge valves arranged in a rectifier circuit to transmit energy from said alternating current circuit to said direct current circuit, a second group of electric discharge valves arranged in an inverter circuit to transmit energy from said direct current circuit to said alternating current circuit, transformer means associated both with said rectifier and said inverter circuits providing a larger ratio of transformation to said inverter circuit than to said rectifier circuit so that the electric valve converting apparatus may operate at maximum efficiency transmitting energy in either direction with a substantially straight line voltage regulation curve.

8. In an electric valve converting apparatus a polyphase alternating current circuit, a direct current load circuit, means for transmitting energy in either direction between said circuits including a plurality of electric discharge valves arranged in a polyphase inverter circuit and a plurality of electric discharge valves arranged in a polyphase rectifier circuit, a transformer associated with each of said rectifier and inverter circuits, said inverter transformer having a larger ratio of transformation than said rectifier transformer, a reactor connected in the direct current circuit of said inverter and a second reactor connected in the direct current circuit of said rectifier, said reactors being mounted on a common core so as to produce flux in the same direction whether energy is being transmitted by the inverter or by the rectifier.

9. In combination, an alternating current circuit of one frequency, a second alternating current circuit of a different frequency, means for transmitting energy between said circuits including a plurality of electric discharge valves so constructed and arranged as to transmit energy in either direction between said circuits, a transformer associated with said electric discharge valves providing a different ratio of transformation between said circuits for energy transmitted in one direction as compared with energy transmitted in the other direction, a reactor connected in said circuits when energy is transmitted in one direction and a second reactor connected in said circuits when energy is transmitted in the other direction, said reactors being mounted on a common core so as to produce flux in the same direction regardless of the direction in which energy is being transmitted.

10. In combination, an alternating current circuit, a direct current circuit, a transformer and a plurality of electric discharge valves arranged to transmit energy in either direction between said circuits, an anode and a cathode for each of said plurality of discharge valves, a control electrode for only those electric discharge valves transmitting energy from said direct current circuit to said alternating current circuit, said transformer providing a different ratio of transformation when transmitting energy from said direct current circuit to said alternating current circuit than when transmitting energy from said alternating current circuit to said direct current circuit so that the apparatus may be operated at maximum efficiency while having a substantially straight line voltage regulation regardless of the direction of energy transferred between said circuits.

11. In an electric valve converting apparatus, an alternating current circuit, a second circuit, means for transmitting energy between said circuits including a plurality of electric discharge valves so constructed and arranged as to transmit energy in either direction between said circuits, a transformer associated with said electric discharge valves providing a different ratio of transformation between said circuits when energy is transmitted from said second circuit to said alternating current circuit than when energy is transmitted from said alternating current circuit to said second circuit such that a straight line voltage regulation curve may be obtained regardless of the direction of energy transfer between said circuits.

RICHARD TRÖGER.

CERTIFICATE OF CORRECTION.

Patent No. 2,210,785. August 6, 1940.

RICHARD TRÖGER.

It is hereby certified that error appears in the printed specification of the above numbered patent requiring correction as follows: Page 1, first column, line 55, strike out "with the rectifier and another reactor connected"; and second column, line 1, strike out "in series"; page 3, first column, line 65, for the word "valve" read --valves--; and that the said Letters Patent should be read with this correction therein that the same may conform to the record of the case in the Patent Office.

Signed and sealed this 10th day of September, A. D. 1940.

(Seal)

Leslie Frazer,
Acting Commissioner of Patents.